US012654457B2

(12) United States Patent
Kuroyanagi et al.

(10) Patent No.: US 12,654,457 B2
(45) Date of Patent: Jun. 16, 2026

(54) LIQUID STORING CARTRIDGE AND PRINTER

(71) Applicant: BROTHER KOGYO KABUSHIKI KAISHA, Nagoya (JP)

(72) Inventors: Sosuke Kuroyanagi, Kariya (JP); Yuma Tanabe, Nagoya (JP); Akinari Ishibe, Okazaki (JP); Satoru Oki, Nagoya (JP); Genki Hoshino, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 135 days.

(21) Appl. No.: 18/192,566

(22) Filed: Mar. 29, 2023

(65) Prior Publication Data

US 2023/0311526 A1 Oct. 5, 2023

(30) Foreign Application Priority Data

Mar. 31, 2022 (JP) ................................. 2022-061282

(51) Int. Cl.
*B41J 2/175* (2006.01)

(52) U.S. Cl.
CPC ................................. *B41J 2/17523* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/1753; B41J 2/17546; B41J 2/17553; B41J 29/02
See application file for complete search history.

(56) References Cited

U.S. PATENT DOCUMENTS

| | | | | |
|---|---|---|---|---|
| 6,281,911 | B1 * | 8/2001 | Nakazawa | B41J 2/17513 347/86 |
| 7,380,909 | B2 | 6/2008 | Ishizawa et al. | |
| 7,828,422 | B2 * | 11/2010 | Kimura | B41J 2/17509 347/49 |
| 2003/0071874 | A1 | 4/2003 | Ishizawa et al. | |
| 2016/0031225 | A1 | 2/2016 | Fujimori et al. | |
| 2016/0200114 | A1 | 7/2016 | Nanjo et al. | |
| 2017/0087855 | A1 | 3/2017 | Takagiwa | |

(Continued)

FOREIGN PATENT DOCUMENTS

| | | |
|---|---|---|
| JP | 2002-019135 A | 1/2002 |
| JP | 2007-083680 A | 4/2007 |

(Continued)

OTHER PUBLICATIONS

Extended European Search Report issued in European Patent Application No. 23162766.2 dated Jul. 12, 2023.

*Primary Examiner* — Anh T Vo
(74) *Attorney, Agent, or Firm* — Kenealy Vaidya LLP

(57) ABSTRACT

There is provided a liquid storing cartridge including: a liquid container configured to store a liquid, the liquid container having a supply port configured to supply the liquid from the liquid container to an outside of the liquid container; a first positioning part provided in a first side with respect to the supply port in a crossing direction crossing an opening direction of the supply port; and a second positioning part provided in a second side with respect to the supply port in the crossing direction, the second side being opposite side from the first side with respect to the supply port.

16 Claims, 13 Drawing Sheets

(56) References Cited

U.S. PATENT DOCUMENTS

| | | | |
|---|---|---|---|
| 2017/0341395 | A1 | 11/2017 | Toya et al. |
| 2020/0376848 | A1 | 12/2020 | Otashiro et al. |
| 2021/0170756 | A1 | 6/2021 | Nakamura et al. |
| 2021/0197574 | A1 | 7/2021 | Kawate et al. |

FOREIGN PATENT DOCUMENTS

| | | | |
|---|---|---|---|
| JP | 2017-65152 | A | 4/2017 |
| JP | 2017-209945 | A | 11/2017 |
| JP | 2020-192740 | A | 12/2020 |
| JP | 2021-088133 | A | 6/2021 |
| WO | 2015/041364 | A1 | 3/2015 |

* cited by examiner

LIQUID STORING CARTRIDGE AND PRINTER

REFERENCE TO RELATED APPLICATIONS

This application claims priority from Japanese Patent Application No. 2022-61282 filed on Mar. 31, 2022. The entire content of the priority application is incorporated herein by reference.

BACKGROUND ART

A cartridge case provided with a first case and a second case which extend in a first direction is known. The first case is provided on a lower side of the second case, an upper side of the first case is opened, and the first case accommodates a liquid storing body in the inside of the first case. The second case is provided on a location above the first case so as to face the first case, and covers the first case.

DESCRIPTION

In a cartridge case described in Japanese Patent Application Laid-Open No. JP2017-65152, a tap supporting part which supports a tap of the liquid storing body is provided on one end part in the first direction of the first case. In a case that the liquid storing body is attached to the cartridge case, the second case is moved, relative to the first case, in a direction opposite to the one end part in the first direction so as to cause the first case to accommodate the liquid storing body. The tap of the liquid storing body is fitted to the tap supporting part. Then, the second case is moved in a direction toward the one end part in the first direction of the first case. The cartridge case accommodating the liquid storing body is inserted into a cartridge installment part of a printer.

In a case that the precision in positioning of the tap of the liquid storing body accommodated in the cartridge case with respect to an ink supplying needle provided on the printer is not satisfactory, there is such a possibility that the ink supplying needle might not enter satisfactorily into the tap, which in turn might cause any connection failure between the tap and the ink supplying needle and/or any leakage of the ink.

An object of the present disclosure is to provide a liquid storing cartridge and a printer each of which is capable of lowering any connection failure of a supply port via which a liquid is supplied from a liquid container and of lowering possibility that the liquid might leak from the supply port.

A liquid storing cartridge according to a first aspect of the present disclosure includes:

- a liquid container configured to store a liquid, the liquid container having a supply port configured to supply the liquid from the liquid container to an outside of the liquid container;
- a first positioning part provided in a first side with respect to the supply port in a crossing direction crossing an opening direction of the supply port; and
- a second positioning part provided in a second side with respect to the supply port in the crossing direction, the second side being opposite side from the first side with respect to the supply port.

In the above-descried liquid storing cartridge, the position of the supply port is positioned (or aligned) with respect to a supplying needle by the first positioning part and the second positioning part. Accordingly, it is possible to lower any possibility that the position of the supply port might be deviated with respect to the supplying needle, to lower any connection failure of the supply port, and to lower any possibility that the liquid might leak from the supply port.

A printer according to a second aspect of the present disclosure includes the above-described liquid storing cartridge. According to the second aspect, in the printer, the position of the supply port is positioned (aligned) with respect to a supplying needle by the first positioning part and the second positioning part. Accordingly, it is possible to lower any possibility that the position of the supply port might be deviated with respect to the supplying needle, to lower any connection failure of the supply port, and to lower any possibility that the liquid might leak from the supply port.

According to a third aspect of the present disclosure, there is provided a liquid storing cartridge to be detachably installed in a printer, the liquid storing cartridge including:

- a liquid container configured to store a liquid to be supplied to the printer, the liquid container having a supply port configured to supply the liquid from the liquid container to the printer;
- a first positioning part provided in a first side with respect to the supply port in a crossing direction crossing an opening direction of the supply port, the first positioning part being configured such that a third positioning part of the printer is engaged with the first positioning part in a state that the liquid storing cartridge is installed in the printer; and
- a second positioning part provided in a second side with respect to the supply port in the crossing direction, the second side being opposite side from the first side with respect to the supply port, the second positioning part being configured such that a fourth positioning part of the printer is engaged with the second positioning part in the state that the liquid storing cartridge is installed in the printer.

Figure 1:
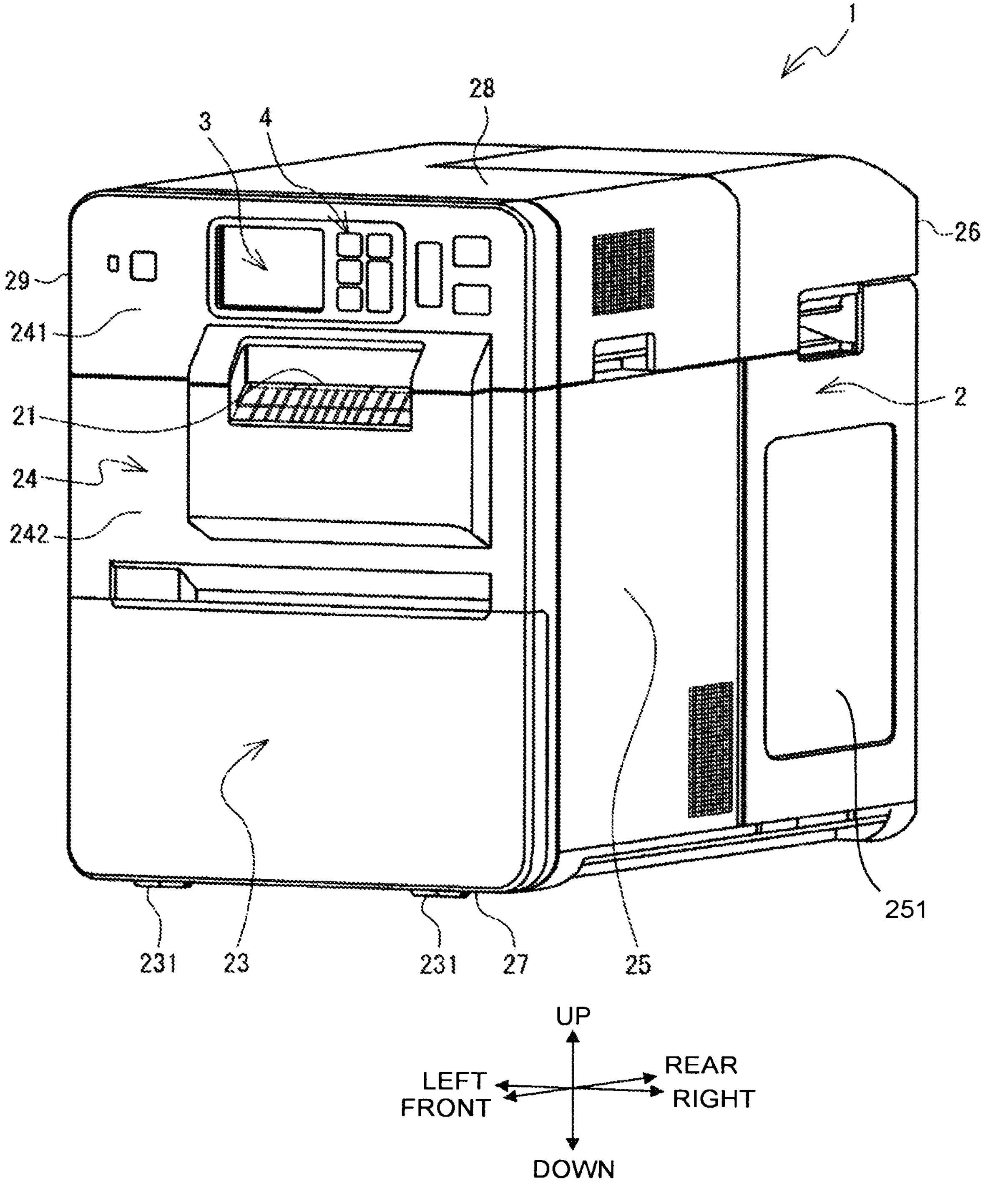
FIG. 1 is a perspective view of a printer 1.

A printer 1 according to an embodiment of the present disclosure will be explained, sequentially with reference to the drawings. In the present embodiment, a mechanical element in the drawings indicates an actual scale in each of the drawings. The drawings which are referred to are used for explaining a technical feature which may be adopted by the present disclosure, and the configuration of an apparatus which is described is not meant to be limited only thereto, and is a mere example for explanation. In the explanation of the present embodiment, a left lower side, a right upper side, a right lower side, a left upper side, an upper side and a lower side of FIG. 1 are, respectively, a front side, a rear side, a right side, a left side, an upper side and a lower side of the printer 1. A left lower side, a right upper side, a right lower side, a left upper side, an upper side and a lower side of FIG. 6 are, respectively, a front side, a rear side, a right side, a left side, an upper side and a lower side of a cartridge 30. FIGS. 1 to 5 are drawings with the directions of the printer 1, whereas FIGS. 6 to 13 are drawings with the directions of the cartridge 30 or the maintenance box 300, and the cartridge 30 and the maintenance box 300 are installed in the printer 1 in a state that the front surfaces of the cartridge 30 and the maintenance box 300 are oriented to face the rear surface of the printer 1.

<Configuration of Printer 1>

The configuration of the printer 1 will be explained, with reference to FIG. 1. The printer 1 is an ink-jet printer which performs printing on a medium having an elongated shape. In a case that print data is inputted to an input terminal (omitted in the drawings), the printer 1 prints the print data on the medium by a printing mechanism (omitted in the drawings) built in the printer 1, and discharges the medium from a discharge port 21 (to be described later on). As depicted in FIG. 1, the printer 1 is provided with a casing 2. The casing 2 has a shape of rectangular parallelepiped having a size placeable or arrangeable on a table or desk, and has a front wall 24, a right wall 25, a rear wall 26, a left wall 29, a bottom wall 27, an upper wall 28 and a front cover 23.

The front wall 24 is provided on a front surface of the casing 2, and has, from the upper side toward the lower side, a first front wall 241 and a second front wall 242. Each of the first front wall 241 and the second front wall 242 is rectangular which is long in a left-right direction as seen from the front side. The first front wall 241 is provided on an upper part on the front side of the casing 2, and the second front wall 242 is provided at a location which is below the first front wall 241 and which is at the center on the front side of the casing 2. Each of the right wall 25, the rear wall 26 and the left wall 29 is rectangular which is long in an up-down direction. Further, each of the bottom wall 27 and the upper wall 28 is rectangular which is long in a front-rear direction.

The discharge port 21 is provided on a boundary between the first front wall 241 and the second front wall 242. The discharge port 21 is a rectangular opening which is long in the left-right direction as seen from the front side, and discharges a medium having printing performed thereon. The first front wall 241 is provided with a displaying part 3 and an operating part 4. The displaying part 3 displays a letter, an image, etc. The operating part 4 is provided on the right side with respect to the displaying part 3. The operating part 4 is provided with a touch panel or a plurality of buttons via which a variety of kinds of instructions are inputted.

The front cover 23 is provided on the front surface of the casing 2 and below the second front wall 242. The front cover 23 is a rectangular lid as seen from the front side, and is provided with a pair of hinges 231 on a lower end part of the front cover 23. By the pair of hinges 231, the front cover 23 is rotatable to a close position (see FIG. 1) at which the front cover 23 closes an opening part 11 and an opening part 12 of an accommodating part 6, depicted in FIG. 3, and to an open position at which the front cover 23 releases (does not cover) the opening part 11 and the opening part 12.

Figure 2:
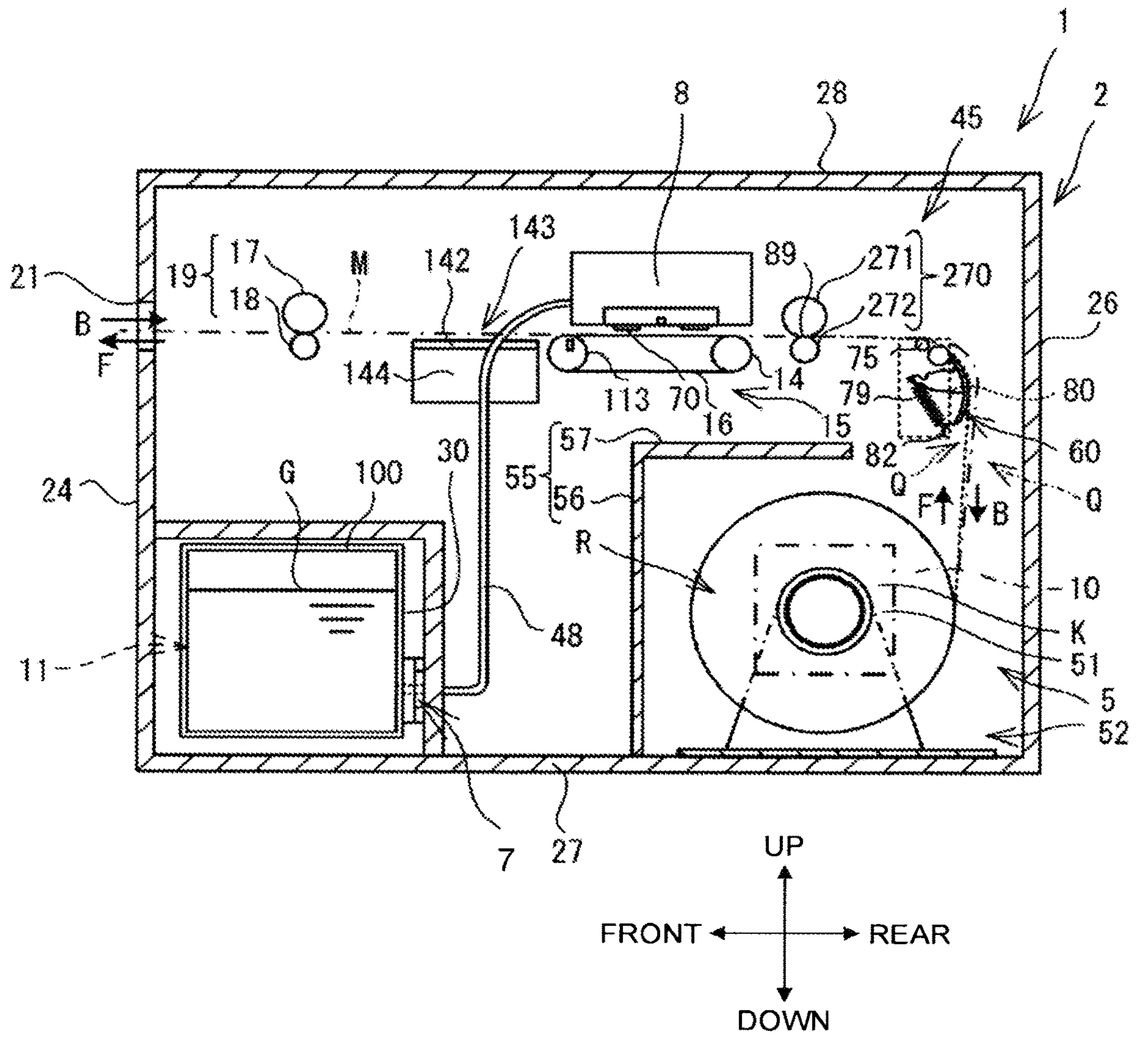
FIG. 2 is a vertical cross-sectional view depicting the internal configuration of the printer 1.

As depicted in FIG. 2, the printer 1 accommodates, in the inside of the casing 2, an ink-jet head 8, a cartridge 30, an ink tube 48, a conveying device 45, a partition wall 55 and a fixing unit 143.

The ink-jet head 8 prints an image on a medium M supplied from a supplying part 5. The ink-jet head 8 is provided with a plurality of nozzles 70 which discharges or ejects an ink G in a discharge direction. The ink-jet head 8 prints the image on the medium M by discharging the ink G from the plurality of nozzles 70. The discharge direction is downward, and the ink-jet head 8 is provided at a location above a conveying route Q of the medium M, while the ink jet head 8 assumes a posture in which the plurality of nozzles 70 is oriented downward. The conveying route Q is a route or path along which the medium M is conveyed since the medium M is fed out from the supplying part 5 and until the medium M is discharged from the discharge port 21 to the outside of the casing 2.

The cartridge 30 is accommodated in the opening part 11. The cartridge 30 accommodates a liquid container 100 which stores the ink in the inside thereof, and is installed in an installment part 7 of the opening part 11. The details of the cartridge 30 will be described later on. The ink tube 48 is arranged in the inside of the casing 2 and connects the installment part 7 and the ink-jet head 8. The ink G in the inside of the cartridge 30 is supplied, via the ink tube 48, from the cartridge 30 to the ink-jet head 8.

The conveying device 45 is provided with the supplying part 5, conveying parts 270, 10, 15 and 19, a supporting part 80, a tension applying part 60 and a rotary body 75. The supplying part 5 is provided on a space which is located on the left side of a side cover 251 at the close position and which is located at a rear lower part of the printer 1 and surrounded by the partition wall 55 and the rear wall 26. The supplying part 5 holds a roll R. The supplying part 5 is provided with a shaft part 51 and a magazine 52. The shaft part 51 extends in the left-right direction, and is inserted into a paper tube K of the roll R. The magazine 52 is a supporting stand which has a shape of a letter “U” as seen from the front side. The magazine 52 supports both of left and right end parts of the shaft part 51 so that the shaft part 51 is rotatable about an axis extending in the left-right direction. The shaft part 51 is supported by the magazine 52 in a state that the shaft part 51 is detachable from the magazine 52. The magazine 52 is supported by the printer 1 in a state that the magazine 52 is detachable from the printer 1.

An operator who replaces the roll R arranges the side cover 251 at the open position, takes out the magazine 52 from the inside of the casing 2 and performs a replacing operation of the roll R.

The conveying part 270 conveys the medium M in a conveying direction F in which the medium M is conveyed from the supplying part 5 toward the ink jet head 8 and to a retuning direction B which is opposite or reverse direction to the conveying direction F. The conveying direction F is a direction along the conveying route Q which is from the supplying part 5 toward the ink-jet head 8. A part, of the conveying direction F, from the suppling part 5 up to the tension applying part 60 is a direction which changes depending on a remaining amount of the medium M, and is generally upward. A part, of the conveying direction F, from the tension applying part 60 up to the discharge port 21 is generally frontward.

The conveying part 270 is provided at a location on an upstream side in the conveying direction F with respect to the ink-jet head 8, and on a downstream side in the conveying direction F with respect to the supplying part 5. That is, the conveying part 270 is provided between the ink-jet head 8 and the supplying part 5 in the conveying route Q of the medium M. The conveying part 270 has a conveying roller 271 which rotates about an axis extending in the left-right direction and a pinch roller 272 which rotates about an axis extending in the left-right direction. The conveying part 270 performs a nip conveyance, by the conveying roller 271 and the pinch roller 272, of conveying the medium M in the conveying direction F which is from the supplying part 5 toward the ink-jet head 8.

The conveying part 10 is provided on the upstream side in the conveying direction F with respect to the conveying part 270, and conveys the medium in the conveying direction F and the retuning direction B. The conveying part 10 rotates the roll R held by the supplying part 5, conveys the medium M in the returning direction B, and takes (winds) the medium M on the roll R. The conveying part 10 detachably engages with the shaft part 51 of the supplying part 5. The conveying part 10 rotates the roll R held by the supplying part 5, conveys the medium M in the conveying direction F, and feeds the medium M from the roll R toward the ink-jet head 8.

The supporting part 80 is provided on the upstream side in the conveying direction F with respect to the conveying part 270 and on the downstream side in the conveying direction F with respect to the conveying part 10, and supports the tension applying part 60 and the rotary body 75. The tension applying part 60 is provided between the conveying part 270 and the conveying part 10 in the conveying route Q. The tension applying part 60 is arranged at a location above the supplying part 5, and is supported in a state that the tension applying part 60 is capable of rocking about an axis extending in the left-right direction, on the upstream side in the conveying direction F with respect to the conveying part 270. The tension applying part 60 makes contact with the medium M and bends the medium M. With this, the tension applying part 60 imparts a tension to the medium M. The tension is a tension acting in a direction opposite to an advancing direction of the medium M.

The rotary body 75 is supported to be rotatable about an axis extending in the left-right direction, on the upstream side in the conveying direction F with respect to the conveying part 270 and on the downstream side in the conveying direction F with respect to at an end part, of the tension applying part 60, on the upstream side in the conveying direction F, namely a lower end part of the tension applying part 60.

The conveying part 15 is provided on a location below the ink-jet head 8 and on the downstream side in the conveying direction F with respect to the conveying part 270, and conveys the medium M in the conveying direction F. The conveying part 15 is provided with a driving roller 113, a driven roller 14 and an endless belt 16. The driving roller 113 and the driven roller 14 are separated from each other in the front-rear direction. The endless belt 16 is stretched over the driving roller 113 and the driven roller 14. Accompanying with the rotation of the endless belt 16, the driven roller 14 is rotated. A position in the up-down direction of an upper end of an outer circumferential surface of the endless belt 16 is substantially same with a position in the up-down direction of a nip point 89 at which the medium M is nipped by the conveying part 270. The upper end of the outer circumferential surface of the endless belt 16 faces or is opposed to the plurality of nozzles 70 of the ink-jet head 8. The upper end of the outer circumferential surface of the endless belt 16 conveys the medium M in a state that the medium M which is (being) conveyed between the conveying part 270 and the conveying part 19 is attracted, by suction from a position below the medium M by a static electricity or a negative pressure, to the endless belt 16.

The fixing unit 143 is arranged on the downstream side in the conveying direction F with respect to the ink-jet head 8 and on the upstream side in the conveying direction F with respect to the conveying part 19. Further, the fixing unit 143 is provided on a location below the conveying route Q. The fixing unit 143 is provided with a heat source 144 which is capable of performing conduction heating and a heating plate (hot plate) 142 which is heated by the heat source 144. The heating plate 142 supports the medium M which passes the conveying route Q from a position below the medium M. The medium M is heated by the heating plate 142, thereby causing the ink G discharged onto the medium M by the ink-jet head 8 to be fixed on the medium M.

The conveying part 19 is provided on the downstream side in the conveying direction F with respect to the ink-jet head 8 and the fixing unit 143 and on the upstream side in the conveying direction F with respect to the discharge port 21, and conveys the medium M in the conveying direction F and in the returning direction B. The conveying part 19 has a conveying roller 17 and a pinch roller 18 each of which rotates about an axis extending in the left-right direction, and performs a nip conveyance, by the conveying roller 17 and the pinch roller 18, of conveying the medium M while nipping the medium M between the conveying roller 17 and the pinch roller 18 in the up-down direction.

In a case that a printing processing is executed, a controller of the printer 1 drives the conveying parts 270, 10, 15 and 19 so as to convey the medium M. The printer 1 adjusts a driving amount of each of the conveying parts 270 and 10 so that the tension is applied to the medium M by the tension applying part 60. The controller of the printer 1 drives the ink-jet head 8 synchronizing with the conveyance of the medium M, thereby discharging, onto the medium M, the ink G supplied from the cartridge 30 via the ink tube 48. The controller of the printer 1 drives the heat source 144 so as to fix, to the medium M, the ink G on the medium M. The medium M is discharged from the discharge port 21 to the outside of the casing 2.

<Configuration of Accommodating Part 6>

Figure 3:
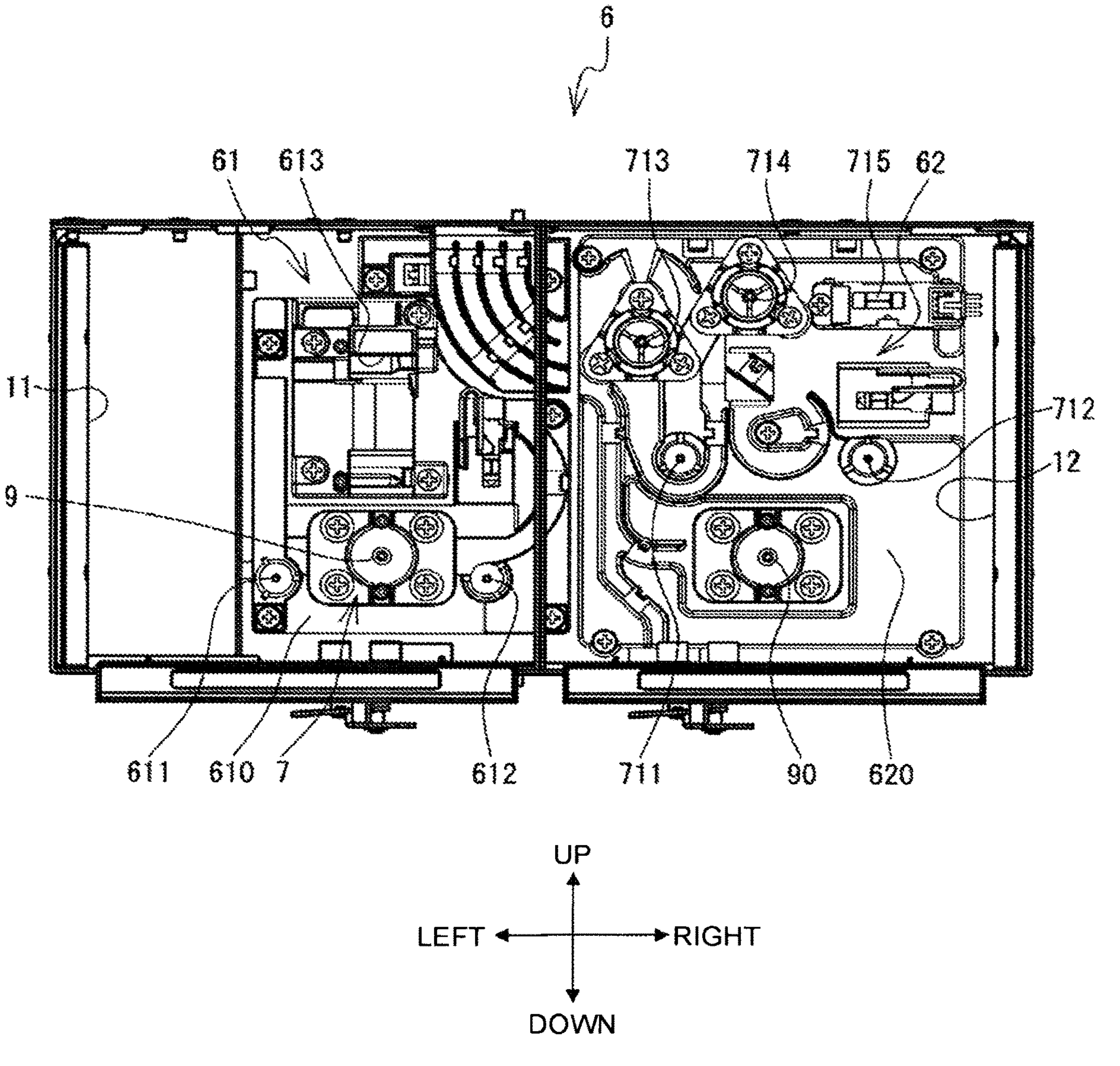
FIG. 3 is a front view of an accommodating part 6.
Figure 4:
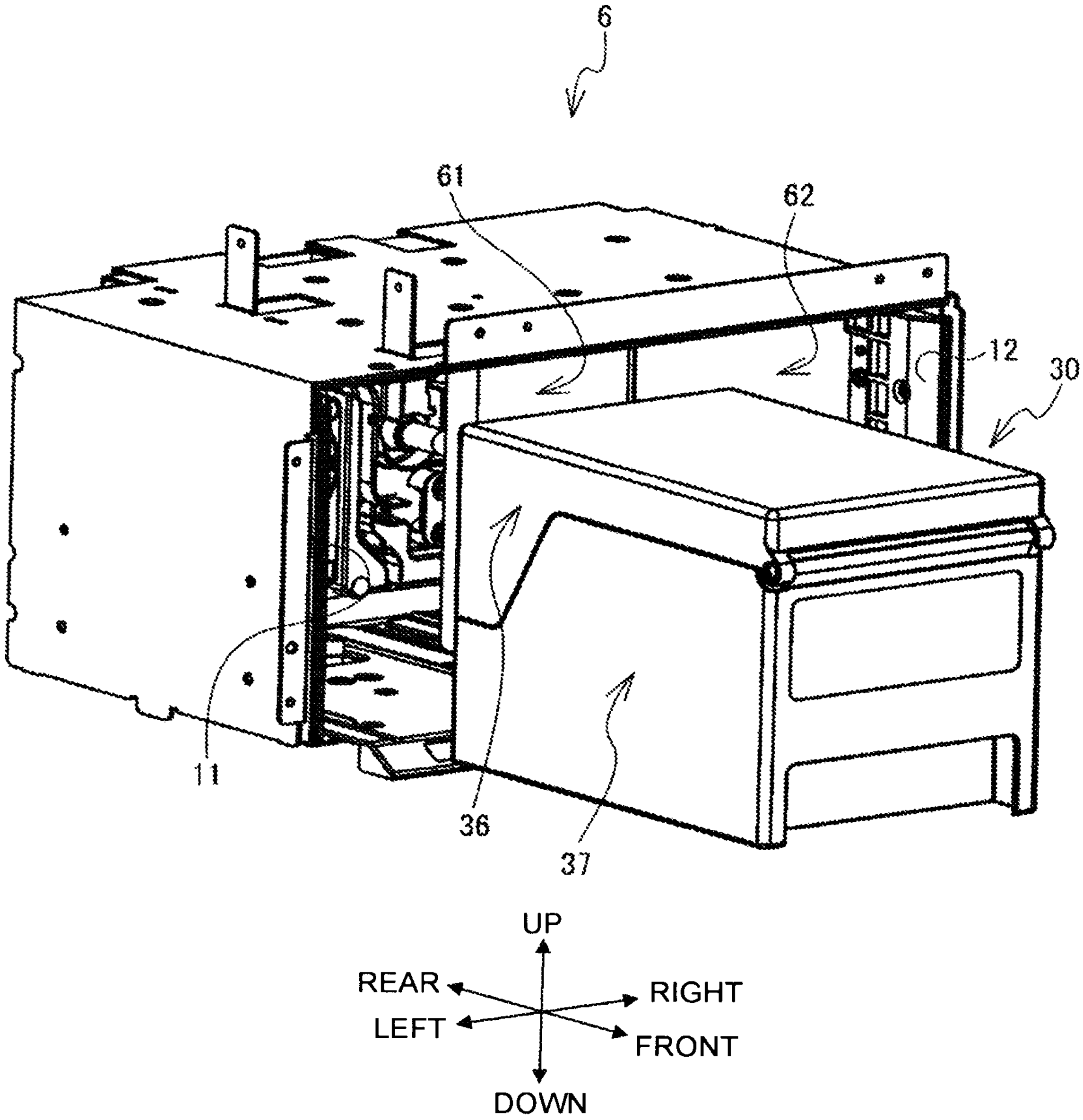
FIG. 4 is a perspective view depicting a state that a cartridge 30 is being inserted into the accommodating part 6.
Figure 5:
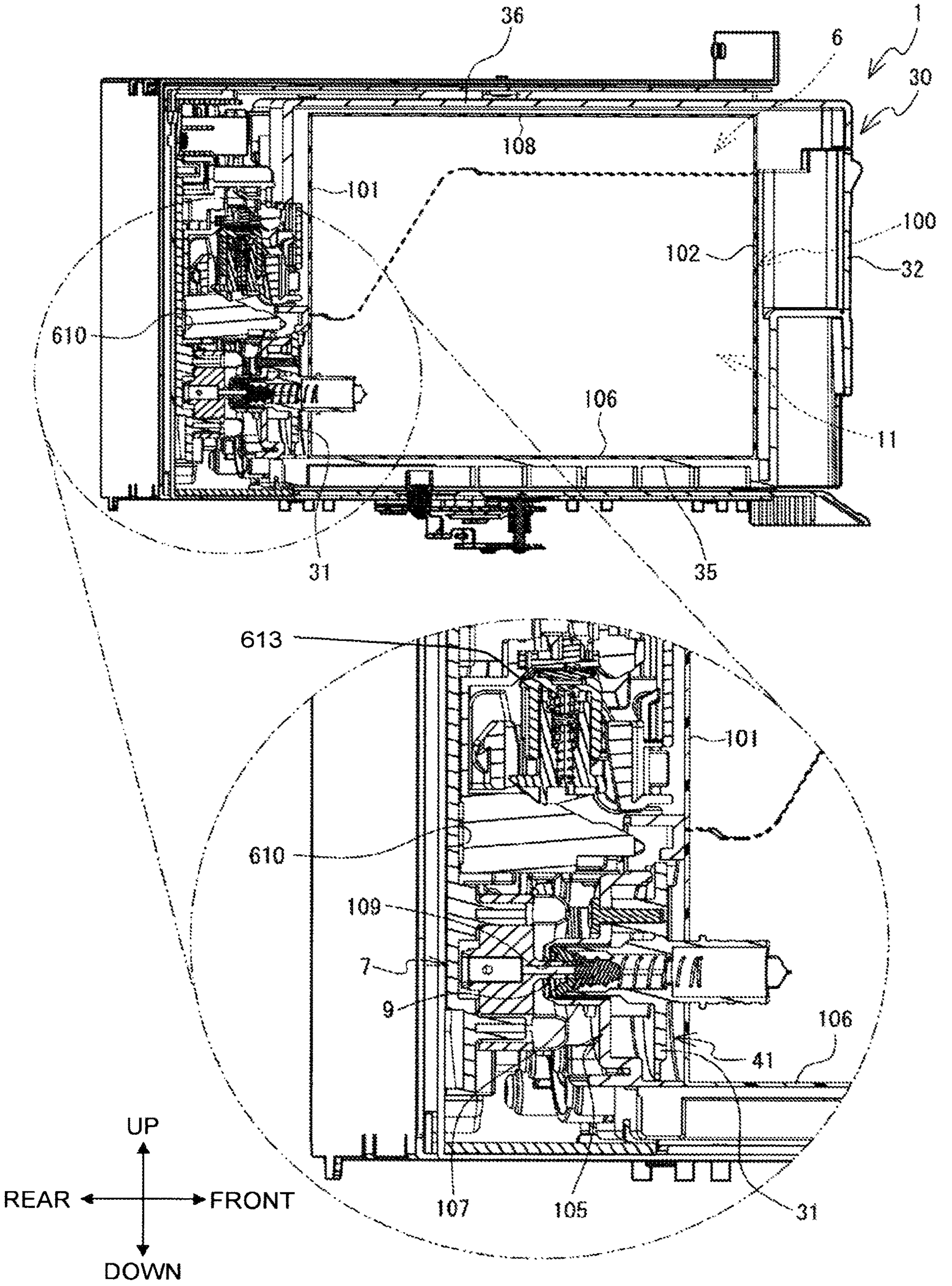
FIG. 5 is a vertical cross-sectional view depicting a state that the cartridge 30 is inserted into the accommodating part 6.
Figure 6:
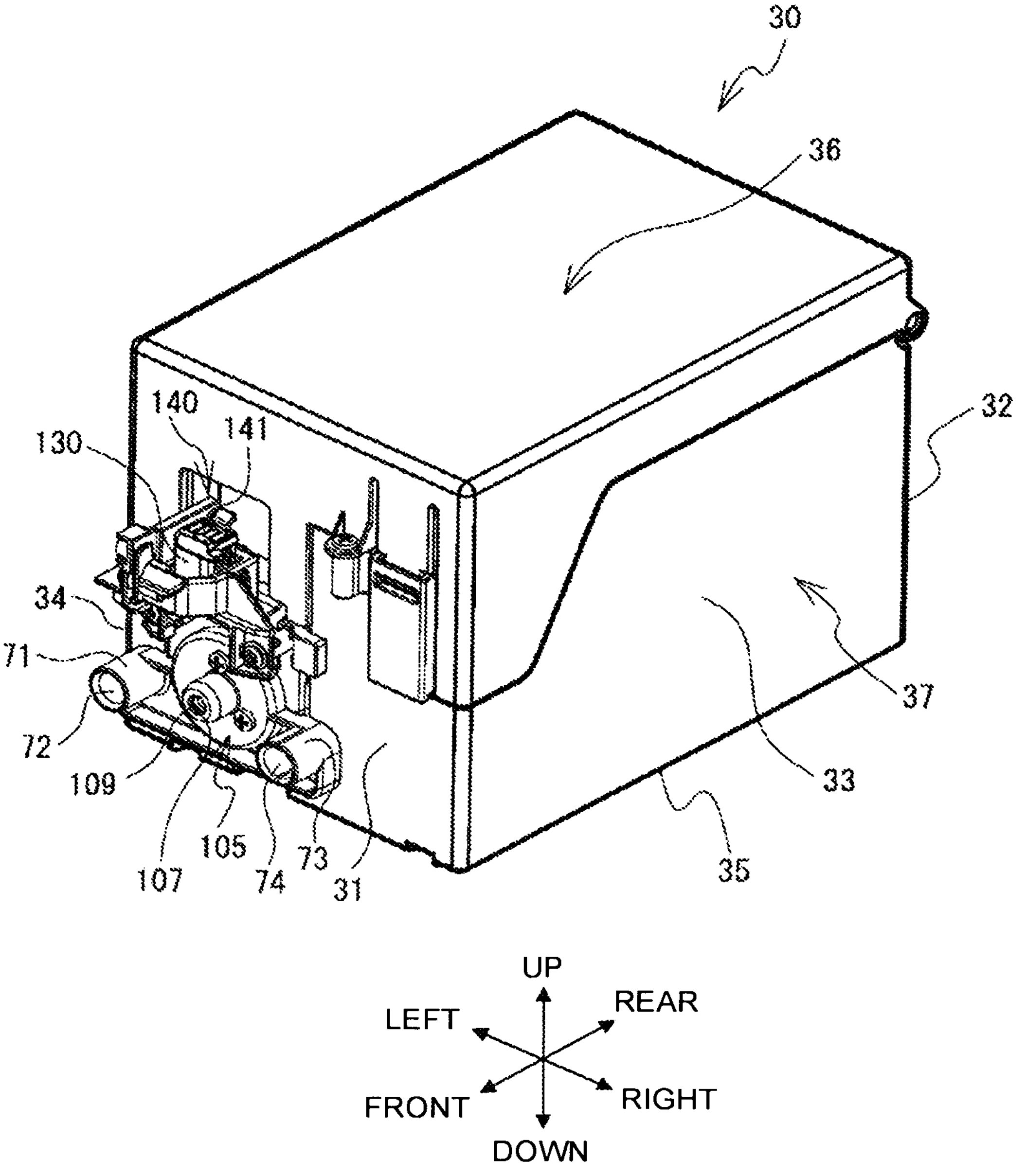
FIG. 6 is a perspective view of the cartridge 30.

With reference to FIGS. 3 to 5, an explanation will be given about the configuration of the accommodating part 6 provided on the inside of the printer 1. FIGS. 3 and 4 depict only the accommodating part 6, and omits other configurations of the printer 1. The accommodating part 6 is provided on the inside of the front cover 23 of the printer 1. The accommodating part 6 has a shape of a rectangular parallelepiped which extends in the left-right direction, and is provided with, from the left side toward the right side, a first accommodating part 61 and a second accommodating part 62. The first accommodating part 61 and the second accommodating part 62 are each a space having a shape of a rectangular parallelepiped, and provided, respectively, with an opening part 11 and an opening part 12 which are opened frontward. In a case that the front cover 23 is changed from the close state to the open state, the opening parts 11 and 12 of the accommodating part 6 are exposed. Each of the opening parts 11 and 12 is a rectangular opening. As depicted in FIGS. 4 and 5, the first accommodating part 61 accommodates a cartridge 30 (to be described later on).

Figure 7:
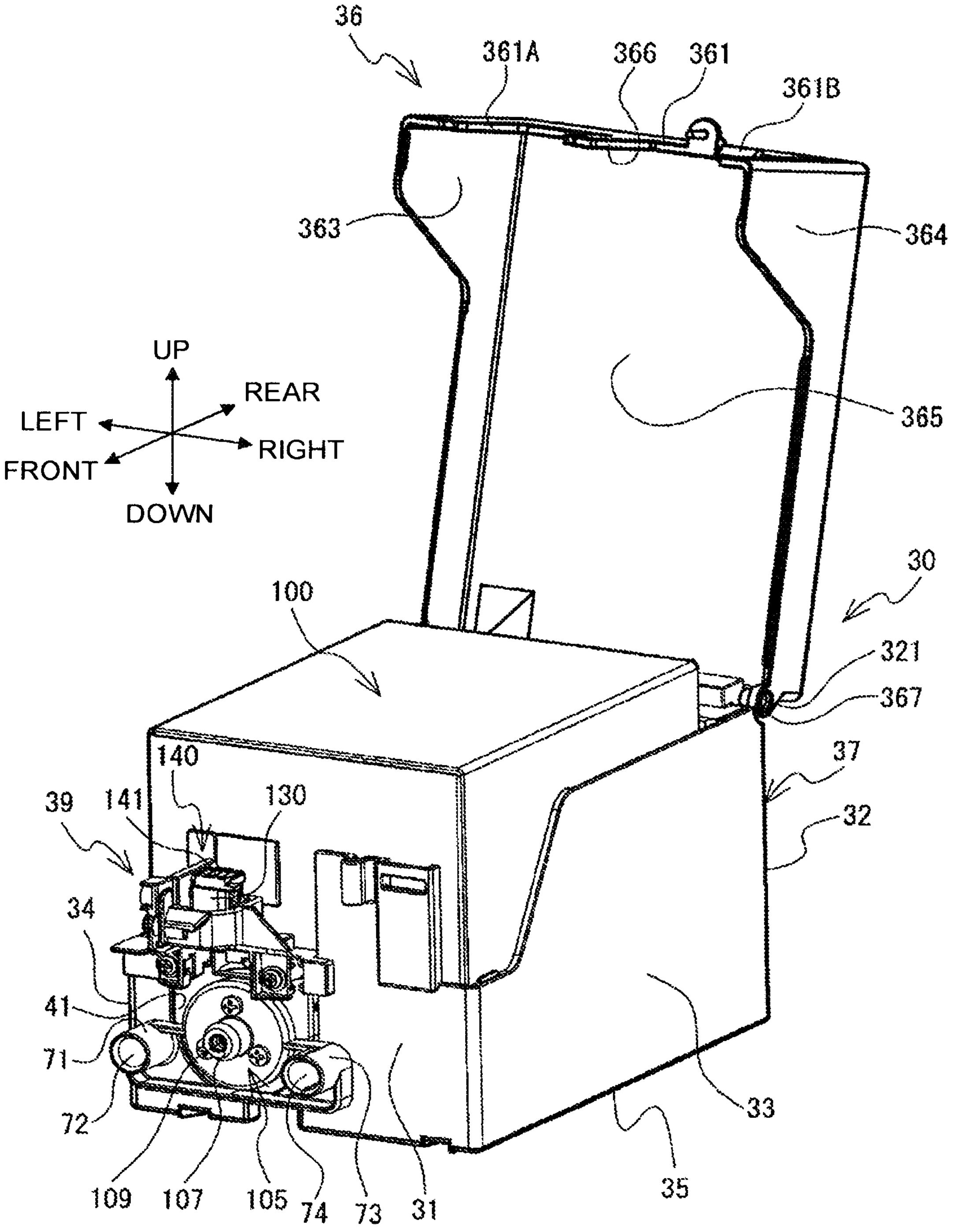
FIG. 7 is a perspective view depicting a state that a liquid container 100 is installed in the cartridge 30.

As depicted in FIG. 6, the cartridge 30 has a shape of a rectangular parallelepiped. As depicted in FIG. 7, the cartridge 30 accommodates or stores the liquid container 100 which stores a liquid. The liquid container 100 accommodates or stores an ink. The liquid container 100 is a pouch made of a synthetic resin. In the following, an example that the ink is stored in the liquid container 100 will be explained. The details of the configuration of the cartridge 30 will be described later on. The second accommodating part 62 accommodates, for example, a maintenance box 300.

As depicted in FIGS. 3 and 5, the first accommodating part 61 is provided with a rear wall 610. The rear wall 610 is a rectangular wall which is provided on the rearmost side in the first accommodating part 61, and extends in the up-down direction and the left-right direction. The rear wall 610 is provided with the installment part 7. The installment part 7 is provided on a location below a center in the up-down direction of the rear wall 610. In a case that the cartridge 30 is accommodated in the first accommodating part 61, a tap (tap unit, mouth stopper, mouth plug) 105 of the liquid container 100 accommodated in the cartridge 30 is installed in the installment part 7. The installment part 7 is provided with a supply needle 9 which projects frontward. The supply needle 9 is hollow inside. In a case that the cartridge 30 is accommodated in the first accommodating part 61 and that the tap 105 is installed in the installment part 7, the supply needle 9 enters into the inside of a supply port 109 of a connecting part 107 of the liquid container 100. Accordingly, the ink inside the liquid container 100 is supplied to the ink-jet head 8 of the printer 1.

Further, a pair of positioning (alignment) projections 611 and 612 (an example of third and fourth positioning parts) is provided on the rear wall 610 of the first accommodating part 61. The positioning projection 611 and the positioning projection 612 are provided, respectively, on positions which are symmetric in the left-right direction with respect to the supply needle 9. The positioning projection 611 and the positioning projection 612 project frontward. A front end of each of the positioning projection 611 and the positioning projection 612 protrudes frontward farther than a front end of the supply needle 9. In a case that the cartridge 30 is inserted into the first accommodating part 61, the positioning projection 612 fits into a circular hole 72 of a first positioning part 71 (to be described later on) and the positioning projection 611 fits into an elongated hole 74 of a second positioning part 73 (to be described later on).

Figure 13:
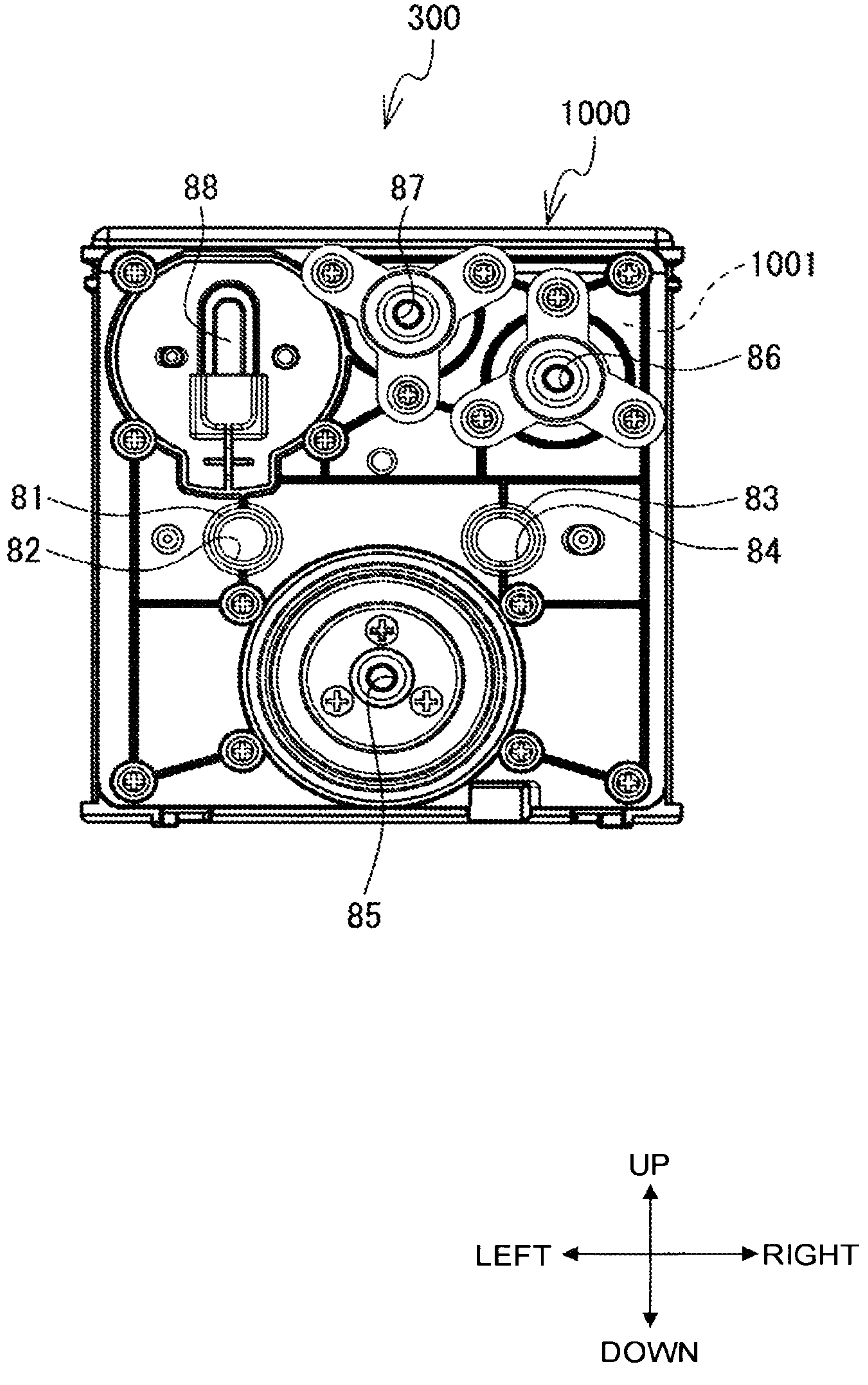
FIG. 13 is a front view of a maintenance box 300.

A maintenance box 300 as depicted in FIG. 13 is accommodated in the second accommodating part 62. The maintenance box 300 has a shape of a rectangular parallelepiped, similarly to the cartridge 30. The maintenance box 300 is fixed in a state that the maintenance box 300 is accommodated in the second accommodating part 62. A storing body 1000 storing a nozzle cleaning liquid for maintenance is accommodated in the maintenance box 300. The detailed configuration of the maintenance box 300 will be described later on.

Further, as depicted in FIG. 3, a pair of positioning (alignment) projections 711 and 712 (another example of third and fourth positioning parts) is provided on a rear wall 620 of the second accommodating part 62. The positioning projection 711 and the positioning projection 712 are provided, respectively, on positions which are symmetric in the left-right direction with respect to a cleaning liquid needle 90. The positioning projection 711 and the positioning projection 712 project frontward. A front end of each of the positioning projection 711 and the positioning projection 712 protrudes frontward farther than a front end of the cleaning liquid needle 90. In a case that the maintenance box 300 is inserted into the second accommodating part 62, the positioning projection 712 fits into a circular hole 82 of a first positioning part 81 as depicted in FIG. 13 and the positioning projection 711 fits into an elongated hole 84 of a second positioning part 83.

<Configuration of Cartridge 30>

With reference to FIGS. 6 to 9, the configuration of the cartridge 30 will be explained. As depicted in FIG. 6, the cartridge 30 has a shape of a rectangular parallelepiped, and is provided with a lower case 37 and a cover 36. As depicted in FIG. 7, the cartridge 30 accommodates or stores the liquid container 100 in the inside of the lower case 37, and the cover 36 is closed as depicted in FIG. 6.

Figure 8:
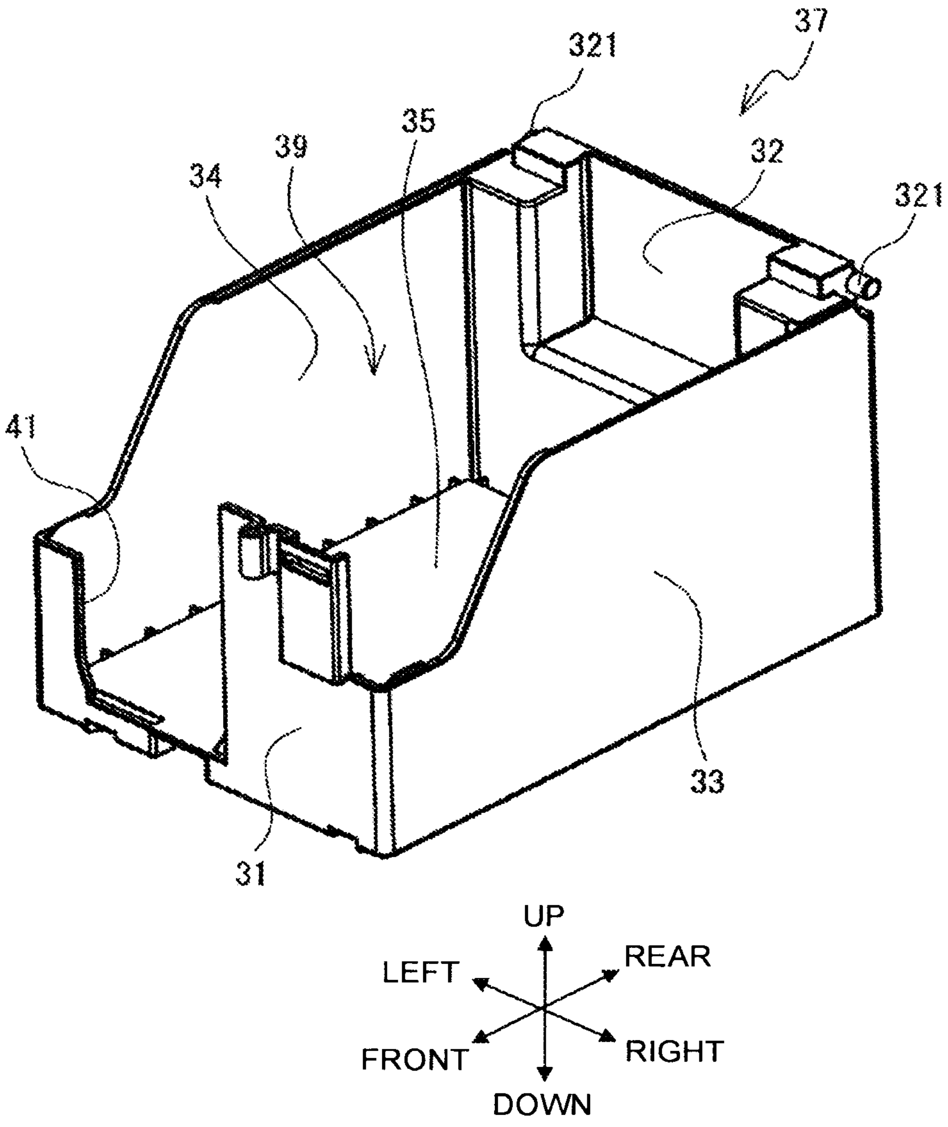
FIG. 8 is a perspective view of a lower case 37.

As depicted in FIG. 8, the lower case 37 is provided with a front wall 31, a rear wall 32, a right wall 33, a left wall 34 and a bottom wall 35. The bottom wall 35 is a rectangular plate which is long in the front-rear direction. The front wall 31 extends upward from a front end of the bottom wall 35. A tap engaging part 41 is provided on a left lower part of the front wall 31. The tap engaging part 41 is an opening part which penetrates the front wall 31 in the front-rear direction and which is opened upwardly. As depicted in FIG. 7, the tap 105 of the liquid container 100 engages with the tap engaging part 41 from a position above the tap engaging part 41. The front wall 31 supports the tap 105 of the liquid container 100.

As depicted in FIG. 8, the right wall 33 of the lower case 37 extends upward from a right end of the bottom wall 35. An upper part on the front side of the right wall 33 is inclined upward further toward the rear side. A length in the up-down direction of a front end part of the right wall 33 is substantially same as a length in the up-down direction of a right end part of the front wall 31. The left wall 34 extends upward from a left end of the bottom wall 35. A length in the up-down direction of a front end part of the left wall 34 is substantially same as a length in the up-down direction of a left end part of the front wall 31. An upper part on the front side of the left wall 34 is inclined upward further toward the rear side. A length in the up-down direction of a part on the rear side of the right wall 33 is approximately two times the length in the up-down direction of the front end part of the right wall 33, and a length in the up-down direction of a part on the rear side of the left wall 34 is approximately two times the length in the up-down direction of the front end part of the left wall 34.

The rear wall 32 extends upward from a rear end of the bottom wall 35. A length in the up-down direction of the rear wall 32 is approximately same as the length of the part on the rear side of each of the right wall 33 and the left wall 34. A pair of shafts 321 protrudes, in the left-right direction, respectively, on a left part and a right part of an upper end of the rear wall 32. An opening 39 which is opened upward is defined by the front wall 31, the right wall 33, the left wall 34 and the rear wall 32. The liquid container 100 is accommodated in the inside of the opening 39.

Figure 9:
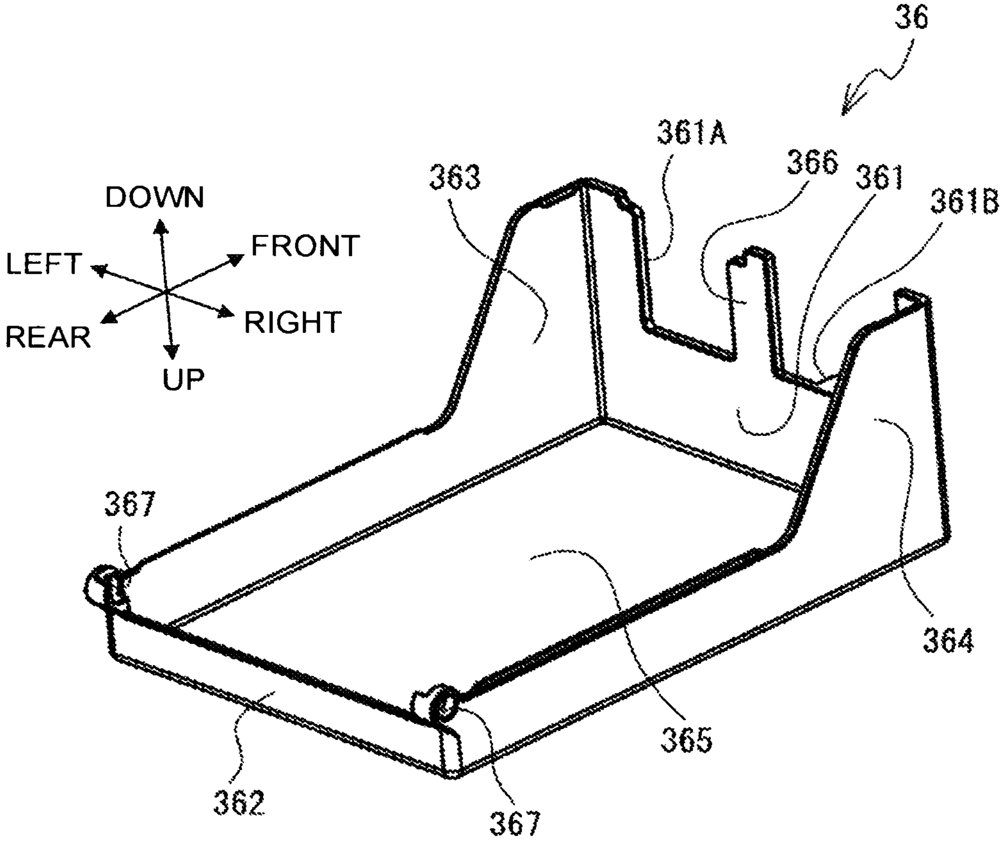
FIG. 9 is a perspective view of the cover 36 depicting a state that a lower side of the cover 36 is oriented upward.

FIG. 9 is a perspective view depicting the cover 36 in a state that a lower side of the cover 36 is oriented upward. As depicted in FIG. 9, the cover 36 is provided with an upper wall 365, a front wall 361, a rear wall 362, a right wall 364 and a left wall 363. The upper wall 365 is a rectangular plate which is long in the front-rear direction. The front wall 361 extends downwards from a front end part of the upper wall 365. A cutout part 361A and a cutout part 361B are provided on the front wall 361, and a side wall 366 extends downward between the cutout part 361A and the cutout part 361B. The rear wall 362 is a rectangular plate which extends downward from a rear end of the upper wall 365, and a pair of bearing parts 367 is provided, respectively, on both of left and right end parts of a lower end of the rear wall 362. The right wall 364 is a plate extending downward from a right end of the upper wall 365; a length in the up-down direction of a front side of the right wall 364 is longer than a length in the up-down direction of a rear side of the right wall 364; and the right wall 364 is provided with an inclined part which is inclined toward the front side from the rear side. The left wall 363 is a plate extending downward from a left end of the upper wall 365; a length in the up-down direction of a front side of the left wall 363 is longer than a length in the up-down direction of a rear side of the left wall 363; and the left wall 363 is provided with an inclined part which is inclined toward the front side from the rear side.

The pair of bearing parts 367 of the cover 36 is rotatably supported, respectively, by the pair of shafts 321 of the lower case 37, thereby causing the cover 36 to rotate to a close state in which the cover 36 covers the opening 39 and to an open state in which the cover 36 does not cover the opening 39. In the open state depicted in FIG. 7, the operator is capable of attaching and detaching the liquid container 100 with respect to the cartridge 30. In a case that the cover 36 is in the closed state, the cartridge 30 is accommodatable in the accommodating part 6 of the printer 1.

<Configuration of Liquid Container 100>

Figure 10:
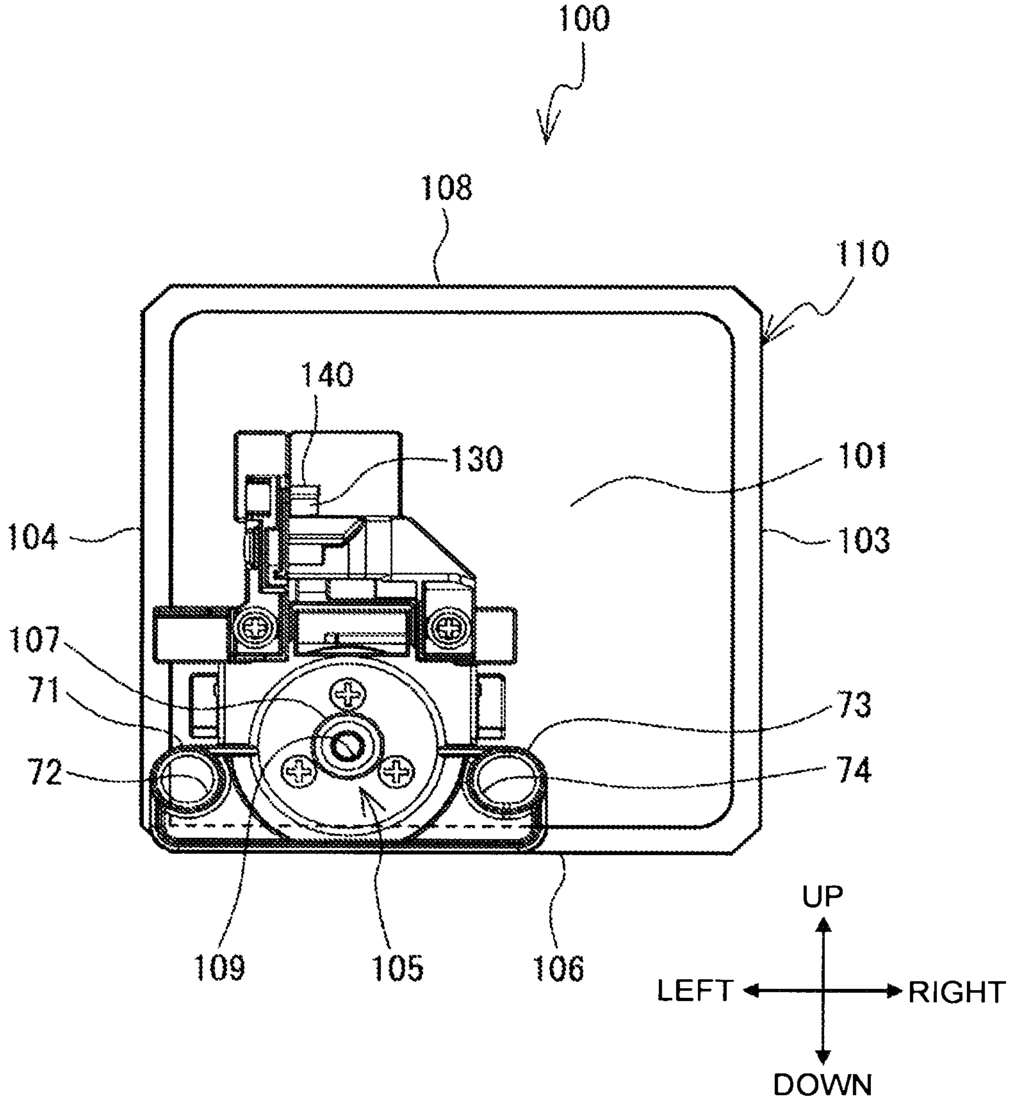
FIG. 10 is a front view of a liquid container 100.
Figure 11:
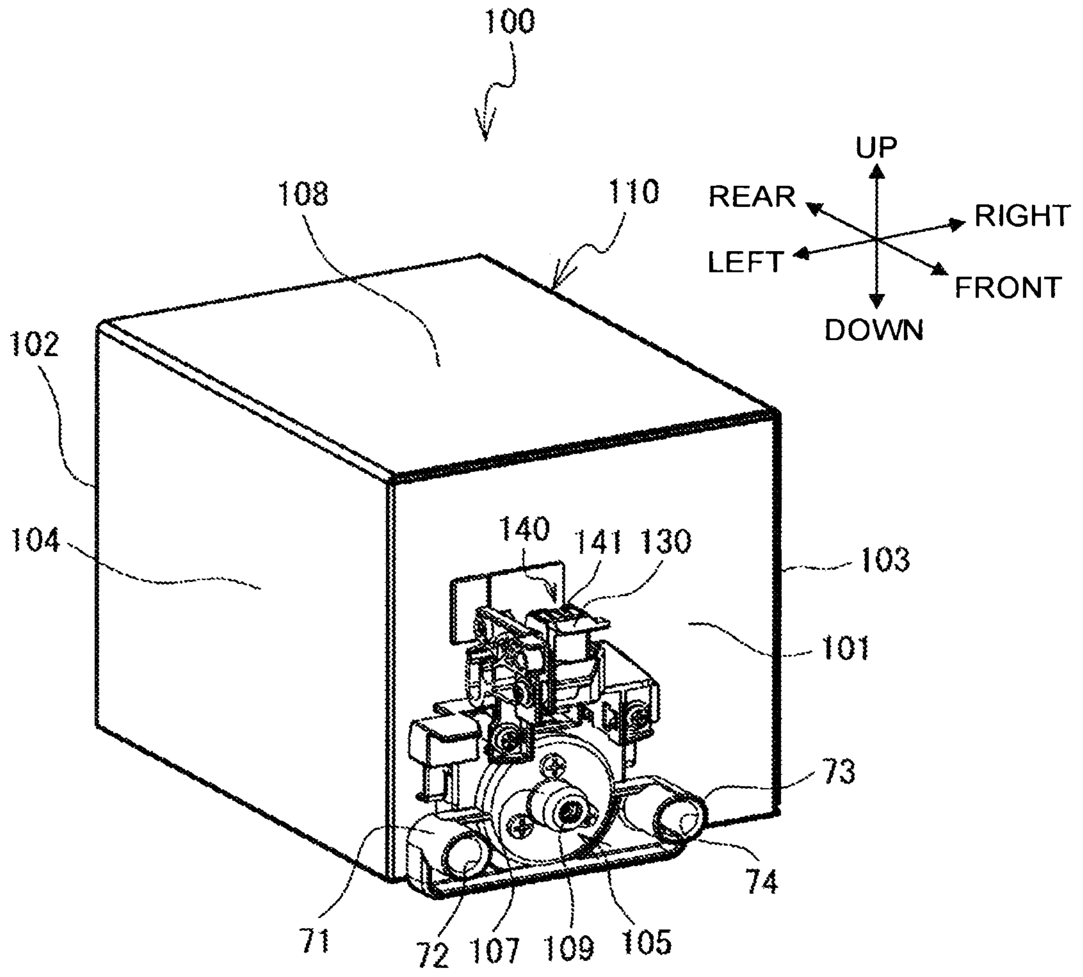
FIG. 11 is a perspective view of the liquid container 100.

With reference to FIGS. 10 and 11, the configuration of the liquid container 100 will be explained. The liquid container 100 stores, as an example, an ink. An example of the ink, for example, is a black ink. The liquid container 100 is provided with a case 110. The case 110 is formed of a pouch made of a synthetic resin. The case 110 has a shape of a rectangular parallelepiped which is long in the front-rear direction. The case 110 is provided with a front surface 101, a rear surface 102, a right side surface 103, a left side surface 104, a bottom surface 106 and an upper surface 108. The bottom surface 106 and the upper surface 108 are each a rectangle which is long in the front-rear direction. The front surface 101 is a rectangle which extends upward from a front end of the bottom surface 106. The right side surface 103 is a rectangle which extends upward from a right end of the bottom surface 106 and which is long in the front-rear direction. The left side surface 104 is a rectangle which extends upward from a left end of the bottom surface 106 and which is long in the front-rear direction. The rear surface 102 is a rectangle which extends upward from a rear end of the bottom surface 106.

<Configuration of Tap 105>

As depicted in FIG. 10, the tap 105 (tap unit) is provided on a left lower part of the front surface 101. The tap 105 is provided with a connecting part 107, the first positioning (alignment) part 71, the second positioning (alignment) part 73 and a circuit board holder 130. The connecting part 107 is a cylinder which extends, with respect to the front surface 101, in a front direction which is orthogonal to the front surface 101. The connecting part 107 has the supply port 109 opened in the front direction at a center of the connecting part 107. The supply port 109 of the connecting part 107 is a supply port via which the ink is supplied from the liquid container 100 to the outside of the liquid container 100. The connecting part 107 extends from the front surface 101 in an opening direction of the supply port 109. Further, a sealing member (omitted in the drawings) is provided on a part which is located on the back side (on the rear side) of the supply port 109. In a case, for example, that the cartridge 30 is detached from the installment part 7 and connection between the supply port 109 of the connecting part 107 and the supply needle 9 is released, any leaking of the ink from the supply port 109 is suppressed by the sealing member.

The first positioning part 71 is provided on a position which is obliquely lower left with respect to the supply port 109, in a crossing direction which crosses the opening direction (front direction) of the supply port 109. The circular hole 72 of which opening is circular is provided on a front end part of the first positioning part 71. The second positioning part 73 is provided on a position which is obliquely lower right with respect to the supply port 109, in the crossing direction which crosses the opening direction (front direction) of the supply port 109. The elongated hole 74 of which opening is elongated in a lateral direction is provided on a front end part of the second positioning part 73. The elongated hole 74 has a size in a long axis (major axis) direction of the elongated hole 74 which is from the elongated hole 74 toward the circular hole 72, namely a size in the left-right direction, and a size in a short axis (minor axis) direction of the elongated hole 74 which is orthogonal to the long axis direction, namely a size in the up-down direction. The size of the elongated hole 74 in the long axis direction is larger than the size of the elongated hole 74 in the short axis direction. An example of the elongated hole is a hole of which opening is an oval or an ellipse.

Figure 12:
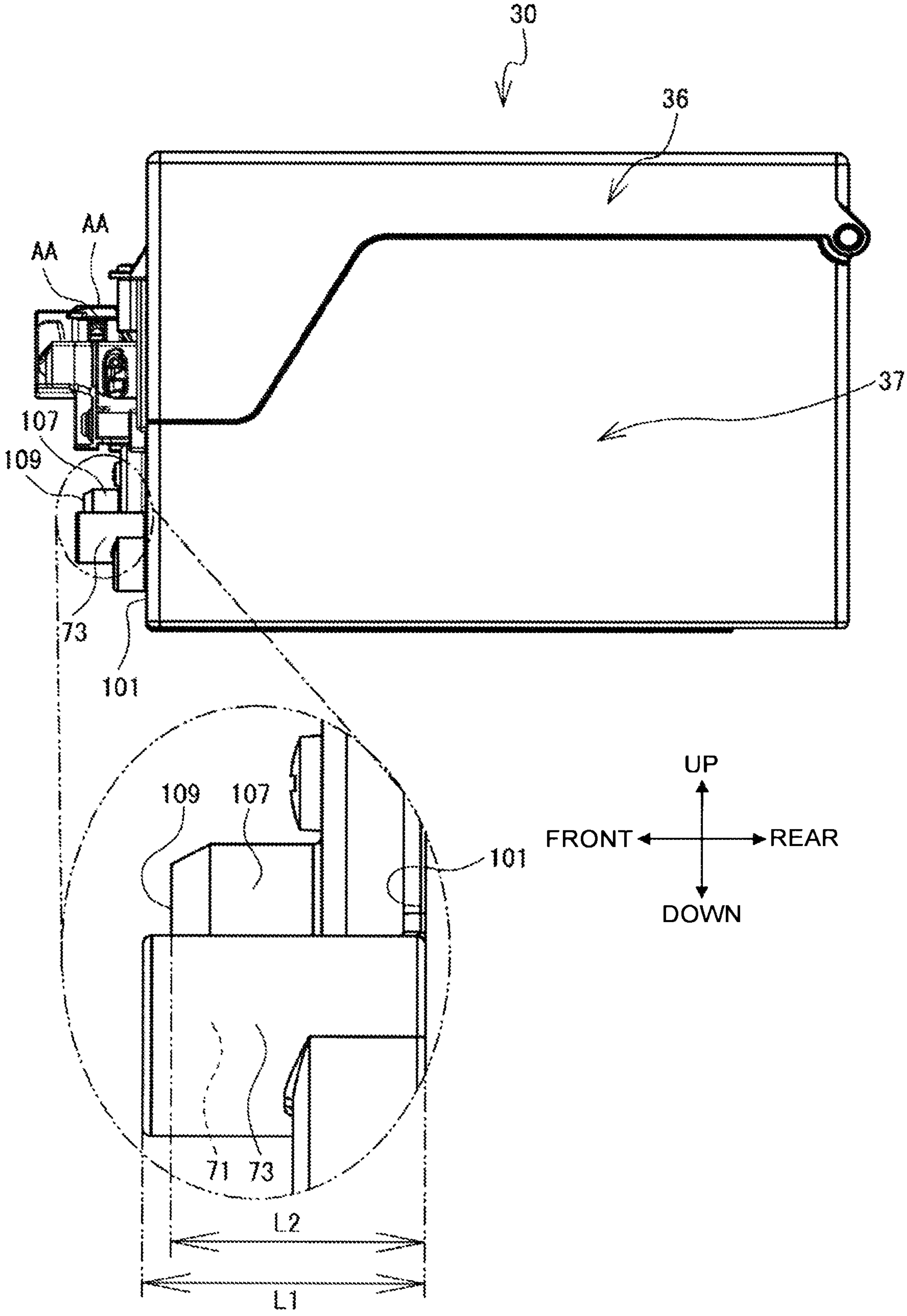
FIG. 12 is a right side view of the cartridge 30.

Further, the first positioning part 71 extends, from the front surface 101, in the opening direction of the supply port 109. Furthermore, the second positioning part 73 extends, from the front surface 101, in the opening direction of the supply port 109. As depicted in FIGS. 11 and 12, each of the first positioning part 71 and the second positioning part 73 is longer in the opening direction (front direction) of the supply port 109 than the connecting part 107. That is, a length L1, from the front surface 101, of each of the first positioning part 71 and the second positioning part 73 in the front-rear direction is longer than a length L2, from the front surface 101, of the connecting part 107 in the front-rear direction. As depicted in FIG. 10, the first positioning part 71 and the second positioning part 73 are provided, respectively, positions which are symmetric in the left-right direction with respect to the supply port 109. Further, the supply port 109, the first positioning part 71 and the second positioning part 73 are provided on positions, respectively, facing the supply needle 9, the positioning projection 612 and the positioning projection 611 in a case that the cartridge 30 is inserted into the first accommodating part 61.

<Configurations of Circuit Board 140 and Circuit Board Holder 130>

As depicted in FIGS. 10 and 11, the tap 105 is provided with the circuit board holder 130 at a location above the supply port 109. That is, the circuit board holder 130 is provided at a position of which height from the bottom surface 106 of the liquid container 100 is greater than a height of the supply port 109 from the bottom surface 106. The circuit board holder 130 holds a circuit board 140 detachably. The circuit board 140 has an electronic circuit built therein, and the electric contact 141 is exposed on the circuit board 140. The circuit board 140 stores information regarding a remaining amount of the liquid stored in the liquid container 100. An example of the circuit board 140 is an IC chip. The circuit boards 140 is held by the circuit board holder 130 in a state that a surface, of the circuit board 140, on which the electric contact 141 is provided faces (is oriented) upward. That is, the cartridge 30 is provided with the circuit board 140 having an electric contact 141, at the position of which height from the bottom surface 106 is greater than the height of the supply port 109 from the bottom surface 106. Note that the electric contact 141 of the circuit board 140 makes contact with a contacting part 613 (see FIGS. 3 and 5) provided on the first accommodating part 61.

Further, as depicted in FIGS. 10 and 11, the circuit board holder 130 is arranged, in the tap 105, above a location between the first positioning part 71 and the second positioning part 73. Accordingly, the circuit board 140 is arranged above the location between the first positioning part 71 and the second positioning part 73.

<Installment and Detachment of Cartridge 30 and Effect of Embodiment>

In a case that the cartridge 30 is to be installed in the printer 1, a user opens the front cover 23 of the printer 1, and inserts the cartridge 30 into the printer 1. Further, in a case that the ink becomes insufficient during usage of the printer 1 and that an instruction of replacing the cartridge 30 is displayed on the displaying part 3, the user opens the front cover 23 of the printer 1 and replaces the cartridge 30. In these cases, since the cartridge 30 is provided with the first positioning part 71 which is provided on one side (first side) with respect to the supply port 109 in the crossing direction crossing the opening direction of the supply port 109, and the second positioning part 73 which is provided on the other side (second side) different from the one side with respect to the supply port 109 in the crossing direction, the position of the supply port 109 is positioned (aligned) with respect to the supply needle 9 by the first positioning part 71 and the second positioning part 73. Accordingly, it is possible to lower any possibility that the position of the supply port 109 might be deviated with respect to the supply needle 9, to lower any connection failure of the supply port 109, and to lower any possibility that the liquid might leak from the supply port 109.

Further, since each of the first positioning part 71 and the second positioning part 73 is longer in the opening direction of the supply port 109 (front direction) than the connecting part 107, the positioning projection 612 and the positioning projection 611 of the first accommodating part 61 are inserted, respectively, into the first positioning part 71 and the second positioning part 73, before the supply needle 9 is inserted into the supply port 109. Accordingly, the supply needle 9 is inserted correctly into the supply port 109.

Furthermore, as depicted in FIG. 10, since the first positioning part 71 and the second positioning part 73 are provided, respectively, on the positions which are symmetric in the left-right direction with respect to the supply port 109, the precision of positioning the supply port 109 in the left-right direction is improved.

Moreover, since the circular hole 72 of which opening is circular is provided on the front end part of the first positioning part 71, the positioning projection 612 is inserted into the circular hole 72 of the first positioning part 71 and the position (positioning) is determined precisely. Further, the elongated hole 74 of the front end part of the second positioning part 73 has the size in the long axis direction from the second positioning part 73 toward the circular hole 72 (or the supply port 109) is greater than the size of the elongated hole 74 in the short axis direction orthogonal to the major axis direction. Accordingly, even in a case that the positioning projection 611 which is inserted into the elongated hole 74 is shifted in the major axis direction of the elongated hole 74, such a possibility that the positioning projection 611 might not be inserted into the elongated hole 74 is lowered.

Furthermore, since the circuit board 140 is provided at the position having the height from the bottom surface 106 of the liquid container 100 which is greater than the height of the supply port 109 from the bottom surface 106, such a possibility that the liquid scattered from the supply port 109 might adhere to the electric contact 141 of the circuit board 140 is lowered. Accordingly, the reliability of the conduction of the electric contact 141 of the circuit board 140 is improved.

Moreover, since the surface, of the circuit board 140, on which the electric contact 141 is provided, is oriented upward, such a possibility that the liquid scattered from the supply port 109 might adhere to the electric contact 141 of the circuit board 140 is lowered. Further, since the circuit board 140 is arranged above the location between the first positioning part 71 and the second positioning part 73, the precision of positioning (alignment) the circuit board 140 with respect to the contacting part 613 provided on the first accommodating part 61 is improved.

The printer 1 is configured such that the cartridge 30 configured as described above can be installed in the printer 1. Accordingly, the printer 1 is capable of lowering a possibility that the position of the supply port 109 might be deviated with respect to the supply needle 9, capable of lowering any connection failure of the supply port 109, and capable of lowering such a possibility that the liquid might leak from the supply port 109.

In the above-described embodiment, the front surface 101 is an example of a “first surface”. The cartridge 30 is an example of a “liquid storing cartridge”.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The liquid container 100 is not limited to being box-shaped. Although the liquid container 100 stores the ink, the liquid container 100 is not limited to this. For example, the liquid container 100 may store a liquid different from the ink. For example, the liquid container 100 may store a preservative liquid (storage liquid, shipping liquid) which is introduced to the ink tube 48 connecting the cartridge 30 and the ink-jet head 8 for a purpose of suppressing any solidification of the ink inside the ink tube 48, in a case that the printer 1 is shipped or in a case that the printer 1 is stored for a long period of time. In this case, it is allowable to adopt, as the preservative liquid, a liquid having such a property that the liquid is less likely to volatilize. Further, it is also allowable to omit the lower case 37 and the cover 36 of the cartridge 30, and to install the liquid container 100 directly in the printer 1. In such a case, the liquid container 100 is an example of a “liquid storing cartridge”.

In the above-described embodiment, although the first positioning part 71 and the second positioning part 73 of the cartridge 30 which stores the ink are described, the present disclosure is not limited to this. As described above, it is allowable to provide a positioning member on the maintenance box. For example, as depicted in FIG. 13, the maintenance box 300 is provided with a cleaning liquid supply port 85, a first positioning (alignment) part 81, a second positioning (alignment) part 83, a waste liquid inflow port 86, an atmosphere communication hole 87 and a waste liquid window 88. The second accommodating part 62 is provided with a cleaning liquid needle 90, a positioning (alignment) projection 711, a positioning (alignment) projection 712, a waste liquid needle 713, an atmosphere communicating needle 714 and a waste liquid sensor 715.

In a case that the maintenance box 300 is installed in the second accommodating part 62, the cleaning liquid needle 90 is inserted into the cleaning liquid supply port 85. With this, a nozzle cleaning liquid stored in a bag 1001 of the storing body 1000 is supplied to the inside of the printer 1, via the cleaning liquid needle 90. In the case that the maintenance box 300 is installed in the second accommodating part 62, the positioning projection 711 and the positioning projection 712 are inserted, respectively, into the elongated hole 84 of the second positioning part 83 and the circular hole 82 of the first positioning part 81. With this, the positioning of the maintenance box 300 in the inside of the printer 1 is performed. In the case that the maintenance box 300 is installed in the second accommodating part 62, the waste liquid needle 713 is inserted into the waste liquid inflow port 86. The nozzles 70 of the ink-jet head 8 are cleaned (washed) by using the nozzle cleaning liquid, and a waste liquid generated by the cleaning is caused to flow, via the waste liquid needle 713, into a space which is different from the storing body 1000 in the inside of the maintenance box 300, so that the waste liquid is thereby collected by the maintenance box 300. In the case that the maintenance box 300 is installed in the second accommodating part 62, the atmosphere communicating needle 714 is inserted into the atmosphere communication hole 87. With this, a space inside the maintenance box 300 is atmospherically communicated with the outside. In a case that the waste liquid collected by the maintenance box 300 is accumulated, a liquid surface of the waste liquid is raised up to a position of the waste liquid window 88. In this situation, since the waste liquid window 88 has a translucency, it is possible to visually recognize the liquid surface of the waste liquid, via the waste liquid window 88, from the outside. Further, in the case that the maintenance box 300 is installed in the second accommodating part 62, the waste liquid window 88 is positioned between a light emitting part and a light receiving part of the waste liquid sensor 715. Accordingly, it is possible to detect whether or not the waste liquid collected by the maintenance box 300 becomes full, via the waste liquid window 88, by the waste liquid sensor 715. By the configuration wherein the maintenance box 300 is provided with the first positioning part 81 and the second positioning part 83 and the second accommodating part 62 is provided with the positioning projection 711 and the positioning projection 712, it is possible to achieve an effect which is similar to that achieved by the cartridge 30 and the first accommodating part 61. The maintenance box 300 is another example of a "liquid storing cartridge".

In the above-described embodiment, although the ink is, for example, the black ink, the ink is not limited to or restricted by this. For example, the ink may be an ink such as a cyan ink, a magenta ink, a yellow ink, a white ink or a clear ink, etc.

In the above-described embodiment, although the liquid container 100 has the shape of rectangular parallelepiped, the liquid container 100 is not limited to this. For example, the shape of the liquid container 100 may be a shape of another polyhedron, or may be cylindrical. Further, it is allowable that the liquid container 100 does not have a shape which is symmetrical in the front-rear direction.

In the embodiment, although each of the first positioning part 71 and the second positioning part 73 is arranged at the position below the supply port 109, it is allowable to arrange each of the first positioning part 71 and the second positioning part 73 at a position above the supply port 109. Alternatively, it is also allowable to arrange either one of the first positioning part 71 and the second positioning part 73 at a position above the supply port 109, and to arrange the other one of the first positioning part 71 and the second positioning part 73 at a position below the supply port 109.

In the above-described embodiment, although the tap 150 is provided on a position which is biased toward the left side surface 104 in the left-right direction, the arrangement of the tap 105 is not limited to this. For example, the tap 105 may be provided on a position which is biased toward the right side surface 103. In such a case, the installment part 7 of the first accommodating part 61 may be provided on a position corresponding to the arrangement position of the tap 105.

In the above-described embodiment, the first positioning part 71 having the circular hole 72 and the second positioning part 73 having the elongated hole 74 is provided on the liquid container 100, and the positioning projections 611, 612 are provided in the printer 1. However, there is no limitation thereto. For example, the printer 1 may be provided with positioning parts (another example of third and fourth positioning parts) each having a structure same as or similar to the structure of the first positioning part 71 or the second positioning part 73, instead of the positioning projections 611, 612; and the liquid container 100 may be provided with projections (another example of first and second positioning parts) each having a structure same as or similar to the structure of the positioning projection 611 or the positioning projection 612, instead of the first and second positioning parts 71, 73. In such a case, the projections provided on the liquid container 100 are inserted into the positioning parts provided in the printer 1, in a case that the cartridge 30 is installed into the printer 1.

Similarly, the printer 1 may be provided with positioning parts (another example of third and fourth positioning parts) each having a structure same as or similar to the structure of the first positioning part 81 or the second positioning part 83, instead of the positioning projections 711, 712; and the maintenance box 300 may be provided with projections (another example of first and second positioning parts) each having a structure same as or similar to the structure of the positioning projection 711 or the positioning projection 712, instead of the first and second positioning parts 81, 83. In such a case, the projections provided on the maintenance box 300 are inserted into the positioning parts provided in the printer 1, in a case that the maintenance box 300 is installed into the printer 1.

What is claimed is:

1. A liquid storing cartridge comprising:

a liquid container configured to store a liquid, the liquid container having a supply port configured to supply the liquid, in an opening direction of the supply port, from the liquid container to an outside of the liquid container;

a first positioning part provided in a first side with respect to the supply port in a crossing direction crossing the opening direction; and a second positioning part provided in a second side with respect to the supply port in the crossing direction, the second side being opposite side from the first side with respect to the supply port, wherein:

the liquid container includes a case having a first surface;

the supply port, the first positioning part and the second positioning part are provided on the first surface;

the supply port is provided in a connecting part extending from the first surface in the opening direction of the supply port;

each of the first positioning part and the second positioning part extends from the first surface in the opening direction;

each of the first positioning part and the second positioning part is longer than the connecting part in the opening direction;

the liquid container has a bottom surface crossing the first surface, the bottom surface extending, from the first surface, in a direction opposite the opening direction; and the liquid container has at least one side surface crossing the first surface, the side surface extending, from the first surface, in the direction opposite the opening direction.

2. The liquid storing cartridge according to claim 1, wherein:

the opening direction is orthogonal to the first surface; and the crossing direction is a direction which extends within the first surface and which is orthogonal to the opening direction.

3. The liquid storing cartridge according to claim 1, wherein:

the liquid container has the bottom surface crossing the first surface;

the opening direction is orthogonal to the first surface; and the crossing direction is a direction which extends within the first surface, which is orthogonal to the opening direction, and which extends along the bottom surface.

4. The liquid storing cartridge according to claim 1, wherein the first positioning part and the second positioning part are positioned symmetrically with respect to a line which passes through the supply port and which is orthogonal to the opening direction and to the crossing direction.

5. The liquid storing cartridge according to claim 1, wherein:

a circular hole is provided at an end of the first positioning part;

an elongated hole is provided at an end of the second positioning part; and the elongated hole has a size in a long axis direction from the elongated hole toward the circular hole and a size in a short axis direction orthogonal to the long axis direction, the size in the long axis direction being larger than the size in the short axis direction.

6. The liquid storing cartridge according to claim 1, wherein the liquid container is provided with the bottom surface, and the liquid storing cartridge further comprises a circuit board having an electric contact, a height of the circuit board from the bottom surface is greater than a height of the supply port from the bottom surface.

7. The liquid storing cartridge according to claim 6, wherein a surface of the circuit board, on which the electric contact is provided, is oriented upward.

8. The liquid storing cartridge according to claim 6, wherein the circuit board is arranged above a location between the first positioning part and the second positioning part.

9. The liquid storing cartridge according to claim 6, wherein the circuit board is configured to store information about a remaining amount of the liquid stored in the liquid container.

10. The liquid storing cartridge according to claim 1, further comprising:

a lower case which has an opening, and which is configured to accommodate the liquid container in the opening; and a cover configured to cover the opening of the lower case.

11. A printer comprising the liquid storing cartridge as defined in claim 1.

12. A printer comprising:

an accommodating part configured to accommodate the liquid storing cartridge as defined in claim 1;

a supplying needle which is configured to be inserted into the supply port of the liquid storing cartridge and which is arranged in the accommodating part;

a third positioning part which is configured to be engaged with the first positioning part of the liquid storing cartridge and which is arranged in the accommodating part; and a fourth positioning part which is configured to be engaged with the second positioning part of the liquid storing cartridge and which is arranged in the accommodating part.

13. The printer according to claim 12, wherein:

each of the first positioning part and the second positioning part of the liquid storing cartridge has a hole;

the third positioning part is a first positioning projection configured to be inserted into the hole of the first positioning part; and the fourth positioning part is a second positioning projection configured to be inserted into the hole of the second positioning part.

14. A liquid storing cartridge to be detachably installed in a printer, the liquid storing cartridge comprising:

a liquid container configured to store a liquid to be supplied to the printer, the liquid container having a supply port configured to supply the liquid, in an opening direction of the supply port, from the liquid container to the printer;

a first positioning part provided in a first side with respect to the supply port in a crossing direction crossing the opening direction, the first positioning part being configured such that a third positioning part of the printer is engaged with the first positioning part in a state that the liquid storing cartridge is installed in the printer; and a second positioning part provided in a second side with respect to the supply port in the crossing direction, the second side being opposite side from the first side with respect to the supply port, the second positioning part being configured such that a fourth positioning part of the printer is engaged with the second positioning part in the state that the liquid storing cartridge is installed in the printer, wherein:

the liquid container includes a case having a first surface;

the supply port, the first positioning part and the second positioning part are provided on the first surface;

the supply port is provided in a connecting part extending from the first surface in the opening direction of the supply port;

each of the first positioning part and the second positioning part extends from the first surface in the opening direction;

each of the first positioning part and the second positioning part is longer than the connecting part in the opening direction;

the liquid container has a bottom surface crossing the first surface, the bottom surface extending, from the first surface, in a direction opposite the opening direction; and the liquid container has at least one side surface crossing the first surface, the side surface extending, from the first surface, in the direction opposite the opening direction.

15. The liquid storing cartridge according to claim 14, wherein:

each of the first positioning part and the second positioning part has a hole;

the third positioning part of the printer is a first positioning projection configured to be inserted into the hole of the first positioning part in the state that the liquid storing cartridge is installed in the printer; and the fourth positioning part of the printer is a second positioning projection configured to be inserted into the hole of the second positioning part in the state that the liquid storing cartridge is installed in the printer.

16. A liquid storing cartridge comprising:

a cartridge;

a liquid container configured to store a liquid, the liquid container having a supply port configured to supply the liquid, in an opening direction of the supply port, from the liquid container to an outside of the liquid container, the liquid container being accommodated or to be accommodated in the cartridge;

a first positioning part provided in a first side with respect to the supply port in a crossing direction crossing the opening direction; and a second positioning part provided in a second side with respect to the supply port in the crossing direction, the second side being opposite side from the first side with respect to the supply port, wherein:

the liquid container includes a case having a first surface;

the supply port, the first positioning part and the second positioning part are provided on the first surface;

the supply port is provided in a connecting part extending from the first surface in the opening direction of the supply port;

each of the first positioning part and the second positioning part extends from the first surface in the opening direction; and each of the first positioning part and the second positioning part is longer than the connecting part in the opening direction.

* * * * *